US012810628B2

(12) United States Patent
He et al.

(10) Patent No.: US 12,810,628 B2
(45) Date of Patent: Nov. 24, 2026

(54) METHOD FOR DETERMINING HEADING ANGLE OF ANGLED PARKING SPACE, VEHICLE, AND STORAGE MEDIUM

(71) Applicant: HUIZHOU DESAY SV AUTOMOTIVE CO., LTD., Huizhou (CN)

(72) Inventors: Wenchao He, Huizhou (CN); Dexiang Wang, Huizhou (CN); Yuanguang Sun, Huizhou (CN)

(73) Assignee: HUIZHOU DESAY SV AUTOMOTIVE CO., LTD., Huizhou (CN)

( * ) Notice: Subject to any disclaimer, the term of this patent is extended or adjusted under 35 U.S.C. 154(b) by 49 days.

(21) Appl. No.: 18/853,772

(22) PCT Filed: Dec. 25, 2023

(86) PCT No.: PCT/CN2023/141370
§ 371 (c)(1),
(2) Date: Oct. 3, 2024

(87) PCT Pub. No.: WO2024/250641
PCT Pub. Date: Dec. 12, 2024

(65) Prior Publication Data

US 2026/0134697 A1 May 14, 2026

(30) Foreign Application Priority Data

Jun. 9, 2023 (CN) ......................... 202310688853.8

(51) Int. Cl.

| | |
|---|---|
| ***G06V 20/58*** | (2022.01) |
| ***B60W 30/06*** | (2006.01) |
| ***G01S 13/931*** | (2020.01) |

(52) U.S. Cl.
CPC .......... *G06V 20/586* (2022.01); *B60W 30/06* (2013.01); *G01S 13/931* (2013.01);
(Continued)

(58) Field of Classification Search
CPC ............... G06V 20/586; B60W 30/06; B60W 2420/403; B60W 2420/408; G01S 13/931; G01S 2013/9314
See application file for complete search history.

(56) References Cited

U.S. PATENT DOCUMENTS

2010/0118140 A1 5/2010 Iwakiri et al.
2021/0303881 A1 9/2021 Hara et al.
(Continued)

FOREIGN PATENT DOCUMENTS

CN 107776570 A 3/2018
CN 108254752 A 7/2018
(Continued)

OTHER PUBLICATIONS

International Search Report in International Application No. PCT/CN2023/141370, dated Apr. 2, 2024, 7 pages.
(Continued)

*Primary Examiner* — Brian A Zimmerman
*Assistant Examiner* — Cal J Eustaquio
(74) *Attorney, Agent, or Firm* — KDW FIRM PLLC

(57) ABSTRACT

Provided are a method for determining a heading angle of an angled parking space, a vehicle, and a storage medium. The method includes acquiring environmental information of a vehicle, where the environmental information is information about a surrounding environment of the vehicle and related to the vehicle driving out of the angled parking space; obtaining a first reference point and a second reference point according to the environmental information, where a line connecting the first reference point and the second reference
(Continued)

point is parallel to a road; and determining, according to coordinates of the first reference point and coordinates of the second reference point, the heading angle of the vehicle parking out of the angled parking space.

9 Claims, 3 Drawing Sheets

(52) U.S. Cl.
CPC . *B60W 2420/403* (2013.01); *B60W 2420/408* (2024.01); *G01S 2013/9314* (2013.01)

(56) References Cited

U.S. PATENT DOCUMENTS

| | | | | |
|---|---|---|---|---|
| 2021/0354687 | A1 | 11/2021 | Fan et al. | |
| 2021/0396536 | A1* | 12/2021 | Inui | G01C 21/3602 |
| 2023/0101882 | A1* | 3/2023 | Nakagawa | B60W 10/18<br>340/932.2 |

FOREIGN PATENT DOCUMENTS

| | | | |
|---|---|---|---|
| CN | 109284731 | A | 1/2019 |
| CN | 110494336 | A | 11/2019 |
| CN | 111674389 | A | 9/2020 |
| CN | 112224198 | A | 1/2021 |
| CN | 112455430 | A | 3/2021 |
| CN | 112622885 | A | 4/2021 |
| CN | 113815554 | A | 12/2021 |
| CN | 114419922 | A | 4/2022 |
| CN | 116691703 | A | 9/2023 |
| DE | 102015118584 | A1 | 5/2017 |
| EP | 2982572 | A2 | 2/2016 |
| EP | 3708466 | B1 | 8/2022 |
| JP | 2002228734 | A | 8/2002 |
| JP | 2008213647 | A | 9/2008 |
| JP | 2014094726 | A | 5/2014 |
| JP | 2014100957 | A | 6/2014 |
| JP | 2022001453 | A | 1/2022 |
| TW | 201223805 | A | 6/2012 |
| WO | 2023054520 | A1 | 4/2023 |

OTHER PUBLICATIONS

Indian Office Action in IN Application No. 202427073701 dated Jun. 19, 2026, 8 pages.
Japanese Office Action in JP Application No. 2024-558140 dated Jan. 13, 2026, 5 pages.

* cited by examiner

METHOD FOR DETERMINING HEADING ANGLE OF ANGLED PARKING SPACE, VEHICLE, AND STORAGE MEDIUM

This is a National Stage Application, filed under 35 U.S.C. 371, of International Patent Application No. PCT/CN2023/141370, filed on Dec. 25, 2023, which is based on and claims priority to Chinese Patent Application No. 202310688853.8 filed with the China National Intellectual Property Administration (CNIPA) on Jun. 9, 2023, the disclosures of which are incorporated herein by reference in their entireties.

TECHNICAL FIELD

The embodiments of the present application relate to the field of autonomous driving technologies and, in particular, to a method for determining a heading angle of an angled parking space, a vehicle, and a storage medium.

BACKGROUND

With the rapid development of electric vehicles, advanced driving assistance systems (ADAS) have become increasingly popular. Automatic parking is one of the most representative functions and can provide drivers with quite a convenient parking experience. However, many automatic parking products on the market do not have a function of angled parking or can implement only perpendicular parking, which causes that the final parking position is inconsistent with the position under the actual scenario, greatly affecting the user experience.

SUMMARY

The present application provides a method for determining a heading angle of an angled parking space, a vehicle, and a storage medium, thereby solving the problem that automatic parking in the related art cannot implement the angled parking-out function.

According to an aspect of the present application, a method for determining a heading angle of an angled parking space is provided. The method includes the steps below.

Environmental information of a vehicle is acquired, where the environmental information is information about the surrounding environment of the vehicle and related to the vehicle driving out of the angled parking space.

A first reference point and a second reference point are obtained according to the environmental information, where a line connecting the first reference point and the second reference point is parallel to a road.

According to coordinates of the first reference point and coordinates of the second reference point, the heading angle of the vehicle parking out of the angled parking space is determined.

According to another aspect of the present application, a vehicle is provided and includes at least radar, at least one camera, at least one processor, and a memory.

The memory is communicatively connected to the at least one processor, where the at least radar and the at least one camera are communicatively connected to the at least one processor and the memory.

The memory is configured to store at least one computer program executable by the at least one processor, and the at least one computer program is configured, when executed by the at least one processor, to cause the at least one processor to perform the method for determining a heading angle of an angled parking space according to any embodiment of the present application.

According to another aspect of the present application, a computer-readable storage medium is provided. The computer-readable storage medium stores computer instructions which, when executed by a processor, cause the processor to perform the method for determining a heading angle of an angled parking space according to any embodiment of the present application.

DETAILED DESCRIPTION

In order that solutions in the present application are better understood by those skilled in the art, the technical solutions in embodiments of the present application are clearly and completely described below in conjunction with drawings in the embodiments of the present application. Apparently, the described embodiments are part, not all, of the embodiments of the present application. Based on the embodiments of the present application, all other embodiments obtained by those of ordinary skill in the art without creative work should fall within the scope of the present application. It is to be understood that steps described in method embodiments of the present application may be performed in a different order and/or in parallel. Additionally, the method embodiments may include additional steps and/or omit some of the illustrated steps. The scope of the present application is not limited in this respect.

The term "include" and variations thereof used herein are intended to be inclusive, that is, "including, but not limited to". The term "based on" refers to "at least partially based on". The term "an embodiment" refers to "at least one embodiment". The term "another embodiment" refers to "at least one other embodiment". The term "some embodiments" refers to "at least some embodiments". Definitions of other terms are given in the description hereinafter.

It is to be noted that the terms such as "first" and "second" in the description, the claims, and the preceding drawings of the present application are used for distinguishing between similar objects and are not necessarily used for describing a particular order or sequence. It is to be understood that data used in this manner are interchangeable where appropriate so that the embodiments of the present application described herein can be implemented in an order not illustrated or described herein. Additionally, terms "including" and "having" and any other variations thereof are intended to encompass a non-exclusive inclusion. For example, a process, method, system, product, or apparatus that includes a series of steps or units not only includes the expressly listed steps or units but may also include other steps or units that are not expressly listed or are inherent to such process, method, product, or apparatus.

It is to be noted that "one" and "multiple" mentioned in the present application are not limiting but illustrative. It is to be understood by those skilled in the art that "one" and "multiple" are construed as "one or more" unless otherwise specified in the context.

The names of messages or information exchanged between multiple apparatuses in the embodiments of the present application are only for illustrative purposes and are not intended to limit the scope of such messages or information.

Embodiment One

Figure 1:
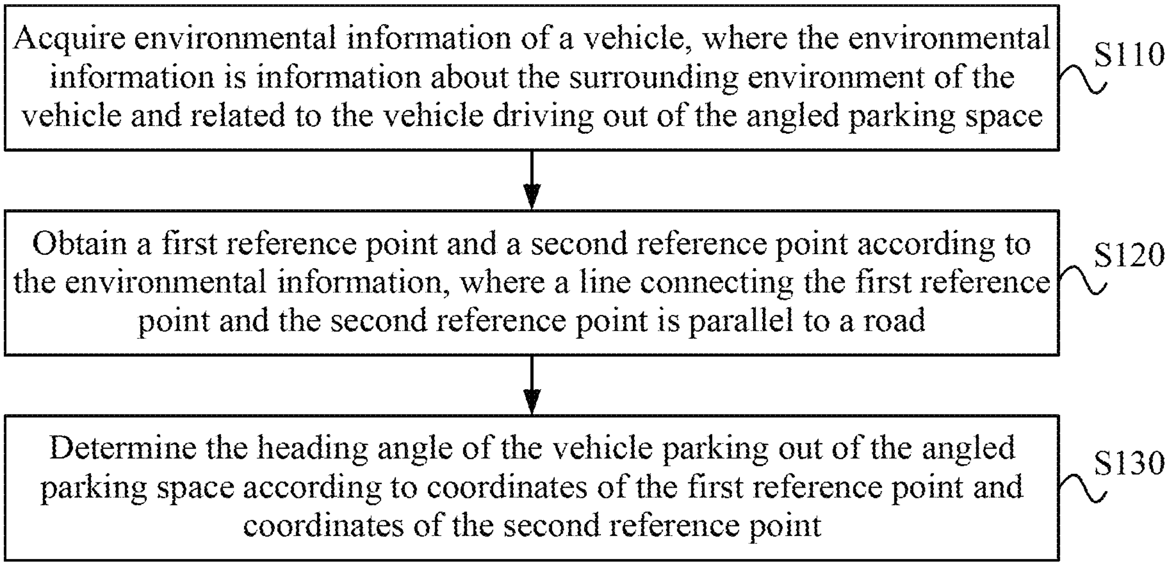
FIG. 1 is a flowchart of a method for determining a heading angle of an angled parking space according to embodiment one of the present application.

FIG. 1 is a flowchart of a method for determining a heading angle of an angled parking space according to embodiment one of the present application. The method is applicable to the case of controlling automatic parking of a vehicle. The method may be performed by an apparatus for determining a heading angle of an angled parking space. The apparatus may be implemented by software and/or hardware and is generally integrated into the vehicle. In this embodiment, the vehicle includes, but is not limited to, an ordinary transport vehicle, a special purpose vehicle, a general purpose vehicle, or the like.

As shown in FIG. 1, the method for determining a heading angle of an angled parking space provided in embodiment one of the present application includes the steps below.

In S110, environmental information of a vehicle is acquired, where the environmental information is information about the surrounding environment of the vehicle and related to the vehicle driving out of the angled parking space.

The vehicle may be in the angled parking space. The angled parking space may have an angle of inclination and mainly has the shape of a parallelogram. The angled parking space may have parking space lines or may not have parking space lines. The environmental information may be information about the surrounding environment of the vehicle and related to the vehicle driving out of the angled parking space. According to the environmental information, whether obstacles exist on the left and right sides of the vehicle may be determined.

In this embodiment, before the vehicle is automatically parked out of the angled parking space, the environmental information around the vehicle may be acquired first to determine whether parking space lines exist in a parking region of the vehicle and whether obstacles exist on the left and right sides of the vehicle. Since the automatic parking function can only perform parking, it may be understood that, before the automatic parking function is activated, the driver deals with the obstacles that are in front of and behind the vehicle and may affect parking out of the angled parking space; if other obstacles are found during the automatic parking process, the vehicle may stop moving and remind the driver that obstacles exist. The details are not repeated in this embodiment.

In S120, a first reference point and a second reference point are obtained according to the environmental information, where a line connecting the first reference point and the second reference point is parallel to a road.

Figure 2:
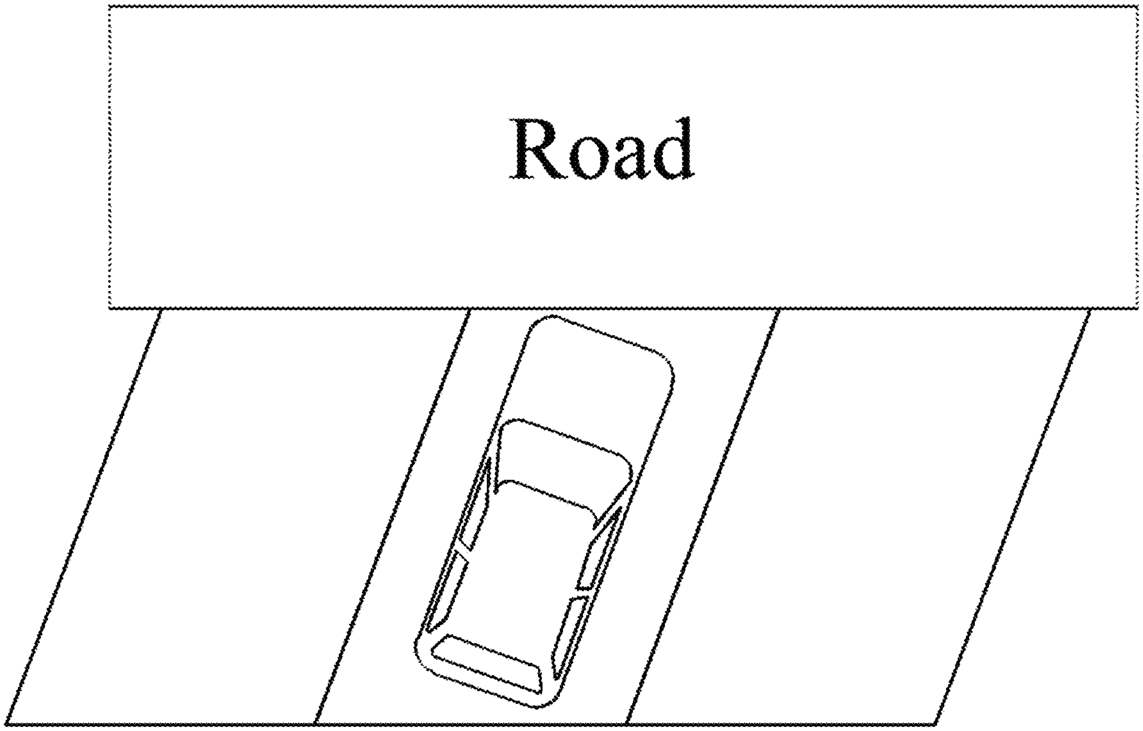
FIG. 2 is a schematic diagram of a road position according to an embodiment of the present application.

The first reference point and the second reference point may be distributed on the left and right sides of the vehicle, respectively, and the line connecting the first reference point and the second reference point is parallel to the road. Different first reference points and different second reference points may be determined according to different pieces of environmental information. For example, the first reference point and the second reference point may be vertices of obstacles on two sides of the vehicle or may be points of intersection of parking space lines. The road may be a lane for the vehicle to drive out of the angled parking space. FIG. 2 is a schematic diagram of a road position according to an embodiment of the present application. As shown in FIG. 2, the road is parallel to the shorter sides of the angled parking space.

In this embodiment, the first reference point and the second reference point may be determined according to the environmental information. For example, if it is determined through the environmental information that obstacles exist on two sides of the vehicle, the information of the obstacles may be acquired, and then the first reference point and the second reference point are determined according to the information of the obstacles. If it is determined through the environmental information that parking space lines exist at least one of: in the parking region of the vehicle or on two sides of the vehicle, the first reference point and the second reference point may be determined according to the points of intersection of the parking space lines.

In S130, according to coordinates of the first reference point and coordinates of the second reference point, the heading angle of the vehicle parking out of the angled parking space is determined.

The coordinates may be the coordinates of the first reference point and the second reference point in the coordinate system. The heading angle may be the angle at which the vehicle parks out of the angled parking space, and the heading angle is the included angle between the y-axis and the line connecting the first reference point and the second reference point. The coordinate system in this embodiment includes the x-axis and the y-axis. The origin of the coordinate system may be set on the vehicle body, for example, in the middle of the vehicle or at another position on the vehicle body.

Figure 3:
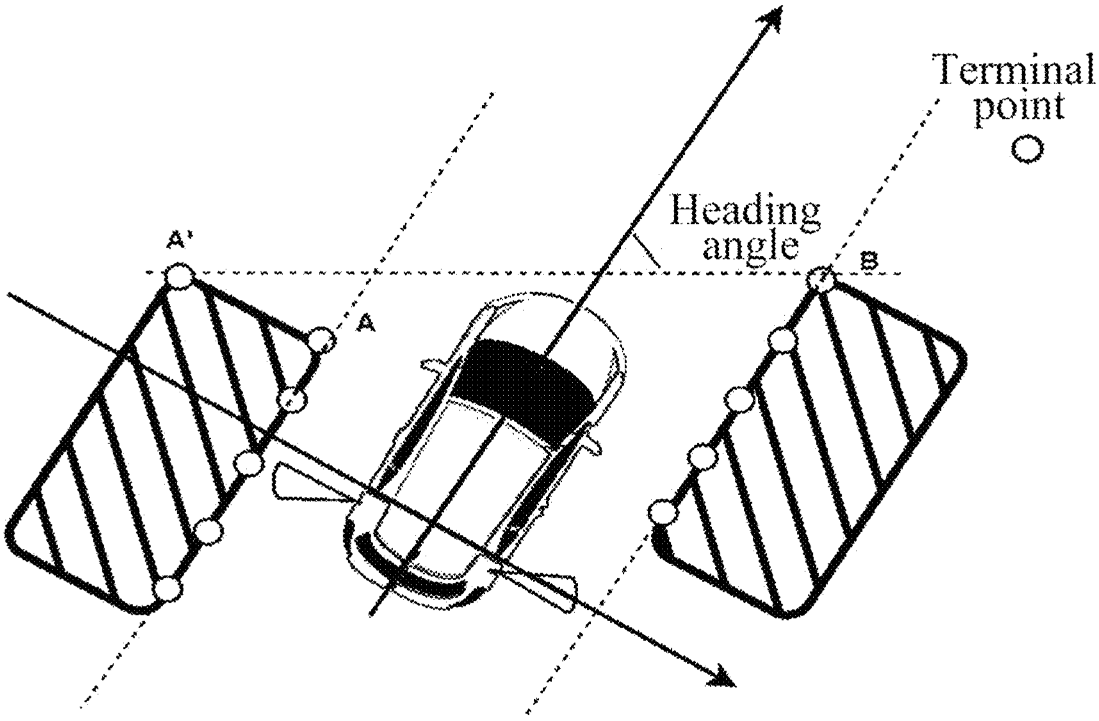
FIG. 3 is a schematic diagram of a coordinate system according to an embodiment of the present application.

In this embodiment, after the first reference point and the second reference point are determined, the coordinates of the first reference point and the coordinates of the second reference point may be acquired so that the heading angle of the vehicle parking out of the angled parking space is determined according to the coordinates of the first reference point and the coordinates of the second reference point. For example, FIG. 3 is a schematic diagram of a coordinate system according to an embodiment of the present application. As shown in FIG. 3, the origin of the coordinate system is set at the rear end of the vehicle body, the x-axis passes through the left and right sides of the vehicle body, and the y-axis passes through the front end and rear end of the vehicle body, where point A' is the first reference point, point B is the second reference point, and the heading angle is the included angle between the line segment A'B and the y-axis.

The embodiment of the present application provides a method for determining a heading angle of an angled parking space. The method includes acquiring environmental information of a vehicle, where the environmental information is information about the surrounding environment of the vehicle and related to the vehicle driving out of the angled parking space; obtaining a first reference point and a second reference point according to the environmental information, where a line connecting the first reference point and the second reference point is parallel to a road; and determining, according to coordinates of the first reference point and coordinates of the second reference point, the heading angle of the vehicle parking out of the angled parking space. In the method, the first reference point and the second reference point are determined according to the environmental information around the vehicle, and the heading angle of the vehicle parking out of the angled parking space is determined according to the coordinates of the first reference point and the coordinates of the second reference point, and then the heading angle from the vehicle can be calculated during the vehicle pulling out of the angled parking space, thereby achieving the final vehicle posture after the angled parking-out is parallel to the actual road and solving the problem that the automatic parking in the related art cannot implement the angled parking-out function.

Based on the preceding embodiment, variant embodiments of the preceding embodiment are proposed. It is to be noted that herein, for the brevity of description, only differences from the preceding embodiment are described in the variant embodiments.

In an embodiment, the environmental information includes image information, and the step of obtaining the first reference point and the second reference point according to the environmental information includes the steps below.

The image information of the surrounding environment of the vehicle is acquired through a camera.

When identifying according to the image information that parking space lines exist at least one of: in a parking region or on two sides of the vehicle, two points of intersection of the parking space lines closest to the front end of the vehicle in the image information and coordinates of the two points of intersection of the parking space lines are identified according to a vision algorithm.

The two points of intersection of the parking space lines are acted as the first reference point and the second reference point, respectively.

The image information may be the image around the vehicle, and the image information may be acquired through the camera on the vehicle. The parking space lines are formed by four corner points and four lines, where the four lines are the entrance line, the left and right dividing lines, and the bottom boundary line. The vision algorithm is a mathematical model that attempts to help the computer understand images. The vision algorithm used in this embodiment may be a bird's eye view (BEV) vision algorithm. The point of intersection of parking space lines may be a point of intersection of parking space lines of adjacent parking spaces.

In this embodiment, the image information of the surrounding environment of the vehicle may be acquired through the camera, and whether parking space lines exist at least one of in the parking region of the vehicle or on two sides of the vehicle may be determined through the image information. In response to determining that the parking space lines exist, two points of intersection of parking space lines closest to the left and right sides of the front end of the vehicle may be identified through the BEV vision algorithm, the coordinates of the two points of intersection of parking space lines are obtained, and the two points of intersection of parking space lines are acted as the first reference point and the second reference point, respectively. In response to determining that parking space lines exist but the points of intersection of parking space lines cannot be identified, the first reference point and the second reference point may be determined by identifying obstacles on two sides of the vehicle. It is to be understood that if the vehicle is parked with the rear end of the vehicle facing the entrance line of the angled parking space, two points of intersection of parking space lines closest to the left and right sides of the rear end of the vehicle are identified.

In this embodiment, in the case where parking space lines exist in the parking region of the vehicle, the first reference point and the second reference point can be determined directly through the points of intersection of parking space lines.

Figure 4:
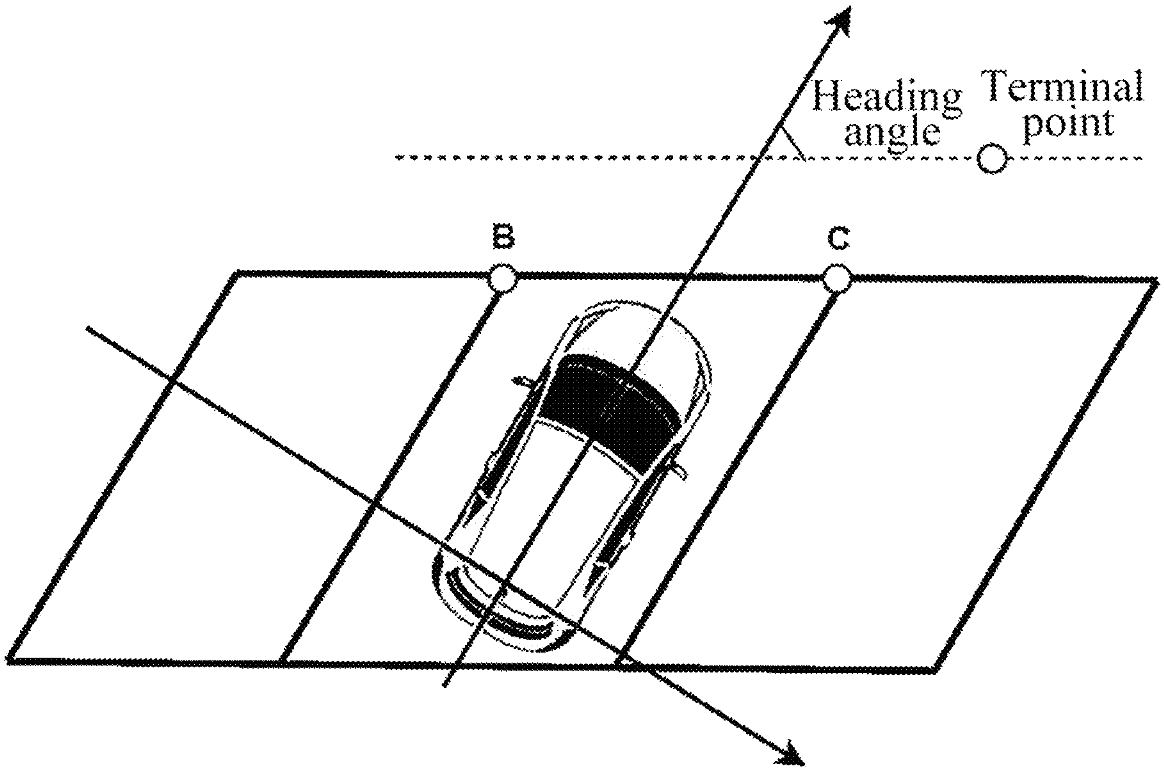
FIG. 4 is a schematic diagram of an angled parking space according to an embodiment of the present application.

For example, FIG. 4 is a schematic diagram of an angled parking space according to an embodiment of the present application. As shown in FIG. 4, parking space lines exist in the parking region of the vehicle and on two sides of the left and right sides, where B and C are two points of intersection of parking space lines closest to the front end of the vehicle, and the line segment BC is parallel to the road, so B and C may be acted as the first reference point and the second reference point, respectively.

In an embodiment, the step of calculating, according to the coordinates of the first reference point and the coordinates of the second reference point, the heading angle of the vehicle parking out includes the steps below.

An included angle between a y-axis and a line segment between the first reference point and the second reference point is calculated according to inverse trigonometric functions, where a direction of the y-axis is the same as a movement direction of the vehicle.

The included angle is acted as the heading angle of the vehicle parking out.

Inverse trigonometric functions are basic elementary functions. The inverse trigonometric function is a general term for the inverses of the sine, cosine, tangent, cotangent, secant, and cosecant, that is, arcsin x, arccos x, arctan x, arccot x, arcsec x, and arccsc x, each of which represents an angle whose sine, cosine, tangent, cotangent, secant, and cosecant is x. The movement direction may be a movement direction of the vehicle.

In this embodiment, the included angle between the y-axis and the line segment between the first reference point and the second reference point may be calculated according to the inverse trigonometric functions, and the included angle may be acted as the heading angle θ of the vehicle parking out. For example, the inverse trigonometric function used in this embodiment may be an inverse tangent. When the coordinates of the first reference point are (x1, y1) and the coordinates of the second reference point are (x2, y2), the heading angle of the vehicle parking out is $$\theta = \arctan\left(\frac{x2 - x1}{y2 - y1}\right).$$

In this embodiment, the heading angle of the vehicle parking out can be accurately calculated through the inverse trigonometric functions so that the final vehicle posture after the angled parking-out is parallel to the actual road.

In an embodiment, before the environmental information of the vehicle is acquired, the method also includes the followings.

Whether automatic parking information of the vehicle exists is determined. In response to determining that the automatic parking information of the vehicle does not exist, an operation of acquiring the environmental information of the vehicle is performed; and in response to determining that the automatic parking information of the vehicle exists, a parking space angle of the vehicle parking in is determined according to the automatic parking information of the vehicle.

According to the parking space angle, the heading angle of the vehicle parking out is determined.

The automatic parking information may be the automatic parking information stored in the vehicle. The parking space angle may be an angle at which the vehicle parks in.

In an embodiment, the automatic parking information may include information about the driver parking into the angled parking space. When the driver pulls out of the angled parking space and enables the automatic parking assist (APA) function, the driver can be prompted to determine the heading angle for the current parking-out according to the parking space angle of the last automatic angled parking-in. In this embodiment, how to determine the heading angle according to the parking space angle is not limited.

In this embodiment, the heading angle of the vehicle parking out can be directly determined according to the automatic parking information when the vehicle stores the automatic parking information so that the final vehicle posture after the angled parking-out is parallel to the actual road.

In an embodiment, the manner of acquiring the heading angle may also include: according to the automatic parking information of the vehicle, determining the parking space angle of the vehicle parking in; and determining, according to the parking space angle, the heading angle of the vehicle parking out.

In this embodiment, the manner of acquiring the heading angle may be determined according to the automatic parking information stored in the vehicle.

Embodiment Two

Figure 5:
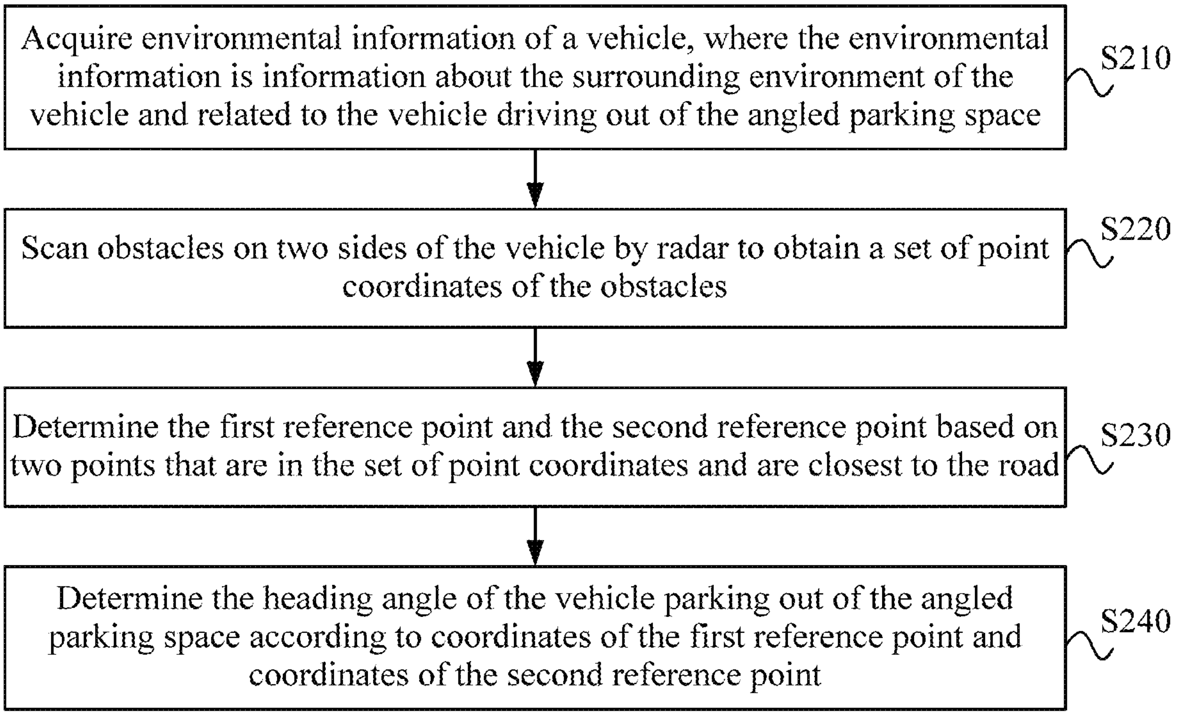
FIG. 5 is a flowchart of a method for determining a heading angle of an angled parking space according to embodiment two of the present application.

FIG. 5 is a flowchart of a method for determining a heading angle of an angled parking space according to embodiment two of the present application. Embodiment two is optimized based on the preceding embodiment. In this embodiment, the environmental information may include obstacle information. For the content not detailed in this embodiment, reference may be made to embodiment one.

As shown in FIG. 5, the method for determining a heading angle of an angled parking space provided in embodiment two of the present application includes the steps below.

In S210, environmental information of a vehicle is acquired, where the environmental information is information about the surrounding environment of the vehicle and related to the vehicle driving out of the angled parking space.

In S220, obstacles on two sides of the vehicle are scanned by radar so that a set of point coordinates of the obstacles is obtained.

The radar may be an electronic device that uses electromagnetic waves to detect targets, and the radar may be mounted on the vehicle. The radar may be lidar, ultrasonic radar, microwave radar, or the like. For example, the radar may be a long-range probe. Obstacles may be other vehicles parked on two sides of the vehicle. The set of point coordinates may be a set of coordinates of points on the obstacles.

In this embodiment, before the vehicle starts to park out, the vehicle is initially parked in the angled parking space. When the vehicle starts to park out, the first section of the path is straight. Therefore, when the vehicle is just about to park out, the radar may scan points on obstacles on the left and right sides of the vehicle at intervals (for example, every 5 centimeters) and determine the coordinates of the scanned points. The x-coordinate of the point on the obstacle may be determined according to the distance between the vehicle and the obstacle scanned by the radar, and the y-coordinate may be determined according to the distance by which the vehicle travels.

In S230, the first reference point and the second reference point are determined based on two points that are in the set of point coordinates and are closest to the road.

In this embodiment, in the obtained set of point coordinates, the first reference point and the second reference point may be determined according to two points that are in the set of point coordinates and are closest to the road. For example, as shown in FIG. 3, the points that are on two sides of the vehicle, are closest to the road, and are last scanned by the vehicle are A and B, respectively.

In an embodiment, the step of determining the first reference point and the second reference point based on the two points that are in the set of point coordinates and are closest to the road includes the steps below.

The two points that are in the set of point coordinates and are closest to the road are acquired.

A point that is not at the edge of the road among the two points is processed so that the first reference point is obtained.

A point at the edge of the road among the two points is acted as the second reference point.

In an embodiment, according to FIG. 3, it can be seen that after the two points A and B that are in the set of point coordinates and are closest to the road are obtained, point B is at the edge of the road, and point B may be directly acted as the second reference point. However, in this case, since the line connecting A and B is not yet parallel to the road, point A still needs to be processed to obtain the first reference point.

The step of processing the point that is not at the edge of the road among the two points to obtain the first reference point also includes the followings.

An x-coordinate of the point that is not at the edge of the road among the two points is translated by a preset distance, where a translation direction is away from the vehicle.

The translated point is acted as the first reference point.

The preset distance may be the width of the obstacle, and the distance by which the point that is not at the edge of the road needs to be translated may be determined through the preset distance. The preset distance may be set according to actual conditions.

In this embodiment, the x-coordinate of the point that is not at the edge of the road may be translated by the preset distance, the translated point may be acted as the first reference point, and the translation direction is away from the vehicle. For example, according to FIG. 3, it can be seen that the line connecting A' and B is parallel to the road, so the coordinates of point A' may be determined according to the coordinates of point A. When the obstacle is a vehicle, the default width of the vehicle may be 1.9 meters (or other values), and the preset distance is 1.9 meters. In this case, relative to the positive direction of the x-axis, point A' is on the left side of point A. Therefore, if the coordinates of point A are (x, y), the coordinates of point A' are (x−1.9, y). That is, point A' is the first reference point, and point B is the second reference point.

In S240, according to coordinates of the first reference point and coordinates of the second reference point, the heading angle of the vehicle parking out of the angled parking space is determined.

The method for determining a heading angle of an angled parking space provided in embodiment two of the present application includes: acquiring environmental information of a vehicle, where the environmental information is information about the surrounding environment of the vehicle and related to the vehicle driving out of the angled parking space; scanning obstacles on two sides of the vehicle by radar to obtain a set of point coordinates of the obstacles; determining the first reference point and the second reference point based on two points that are in the set of point coordinates and are closest to the road; and determining, according to coordinates of the first reference point and coordinates of the second reference point, the heading angle of the vehicle parking out of the angled parking space. In this method, the radar scans the obstacles on two sides of the vehicle to obtain the set of point coordinates of the obstacles, and the first reference point and the second reference point are determined based on two points that are in the set of point coordinates and are closest to the road. In this manner, in the case where no parking space line exists in the angled parking space, the heading angle of the vehicle parking out of the angled parking space can be calculated, thereby achieving the final vehicle posture after the angled parking-out is parallel to the actual road and solving the problem that the automatic parking in the related art cannot implement the angled parking-out function.

Embodiment Three

Figure 6:
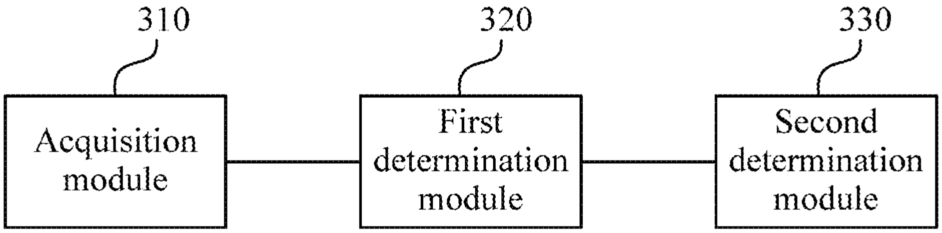
FIG. 6 is a structural diagram of an apparatus for determining a heading angle of an angled parking space according to embodiment three of the present application.

FIG. 6 is a structural diagram of an apparatus for determining a heading angle of an angled parking space according to embodiment three of the present application. The apparatus is applicable to the case of controlling automatic parking of the vehicle. The apparatus may be implemented by software and/or hardware and is generally integrated into the vehicle.

As shown in FIG. 6, the apparatus includes an acquisition module 310, a first determination module 320, and a second determination module 330.

The acquisition module 310 is configured to acquire environmental information of a vehicle, where the environmental information is information about the surrounding environment of the vehicle and related to the vehicle driving out of the angled parking space.

The first determination module 320 is configured to obtain a first reference point and a second reference point according to the environmental information, where a line connecting the first reference point and the second reference point is parallel to a road.

The second determination module 330 is configured to determine, according to coordinates of the first reference point and coordinates of the second reference point, the heading angle of the vehicle parking out of the angled parking space.

The apparatus for determining a heading angle of an angled parking space provided in embodiment three of the present application includes an acquisition module, a first determination module, and a second determination module. The acquisition module is configured to acquire environmental information of a vehicle, where the environmental information is information about the surrounding environment of the vehicle and related to the vehicle driving out of the angled parking space. The first determination module is configured to obtain a first reference point and a second reference point according to the environmental information, where a line connecting the first reference point and the second reference point is parallel to a road. The second determination module is configured to determine, according to coordinates of the first reference point and coordinates of the second reference point, the heading angle of the vehicle parking out of the angled parking space. The first reference point and the second reference point are determined according to the environmental information around the vehicle, and the heading angle of the vehicle parking out of the angled parking space is determined according to the coordinates of the first reference point and the coordinates of the second reference point, and then the heading angle from the vehicle can be calculated during the vehicle pulling out of the angled parking space, thereby achieving the final vehicle posture after the angled parking-out is parallel to the actual road and solving the problem that the automatic parking in the related art cannot implement the angled parking-out function.

The environmental information also includes obstacle information. The first determination module 320 includes a scanning unit and a determination unit.

The scanning unit is configured to scan obstacles on two sides of the vehicle by radar to obtain a set of point coordinates of the obstacles.

The determination unit is configured to determine the first reference point and the second reference point based on two points that are in the set of point coordinates and are closest to the road.

The determination unit also includes acquiring the two points that are in the set of point coordinates and are closest to the road; processing a point that is not at the edge of the road among the two points to obtain the first reference point; a point at the edge of the road among the two points acting as the second reference point.

Processing the point that is not at the edge of the road among the two points to obtain the first reference point also includes the followings. An x-coordinate of the point that is not at the edge of the road among the two points is translated by a preset distance, where a translation direction is away from the vehicle. The translated point is acted as the first reference point.

The environmental information also includes image information. The first determination module 320 includes the followings.

The image information of the surrounding environment of the vehicle is acquired through a camera.

When identifying according to the image information that parking space lines exist at least one of in a parking region or on two sides of the vehicle, two points of intersection of the parking space lines closest to the front end of the vehicle in the image information and coordinates of the two points of intersection of the parking space lines are identified according to a vision algorithm.

The two points of intersection of the parking space lines are acted as the first reference point and the second reference point, respectively.

Calculating, according to the coordinates of the first reference point and the coordinates of the second reference point, the heading angle of the vehicle parking out includes the followings.

An included angle between a y-axis and a line segment between the first reference point and the second reference point is calculated according to inverse trigonometric functions, where a direction of the y-axis is the same as a movement direction of the vehicle.

The included angle is acted as the heading angle of the vehicle parking out.

Before the environmental information of the vehicle is acquired, the method also includes the followings.

Whether automatic parking information of the vehicle exists is determined. In response to determining that the automatic parking information of the vehicle does not exist, an operation of acquiring the environmental information of the vehicle is performed; and in response to determining that the automatic parking information of the vehicle exists, a parking space angle of the vehicle parking in is determined according to the automatic parking information of the vehicle.

According to the parking space angle, the heading angle of the vehicle parking out is determined.

The preceding apparatus for determining a heading angle of an angled parking space can perform the method for determining a heading angle of an angled parking space provided in any embodiment of the present application and has functional modules and beneficial effects corresponding to the performed method.

Embodiment Four

Figure 7:
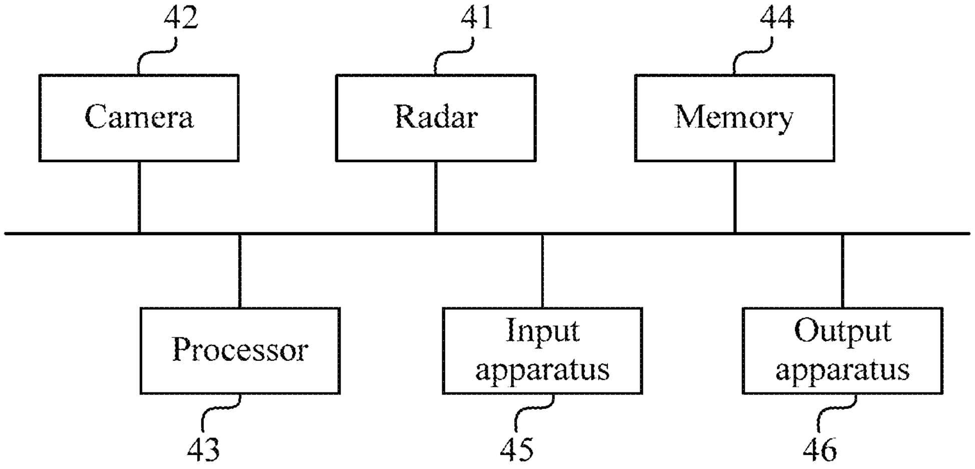
FIG. 7 is a structural diagram of a vehicle according to an embodiment of the present application.

FIG. 7 is a structural diagram of a vehicle that may be used for implementing the embodiments of the present application. The vehicle is intended to mean a wheeled vehicle that is driven or towed by a power device, travels on the road and is used by passengers, or is used for transporting goods and performing special engineering operations, such as an ordinary transport vehicle, a special purpose vehicle, a general purpose vehicle, or another similar vehicle. As shown in FIG. 7, the vehicle includes at least radar 41, at least one camera 42, at least one processor 43, a memory 44 communicatively connected to the at least one processor, an input apparatus 45, and an output apparatus 46. In FIG. 7, the case where the radar 41, one camera 42, and one processor 43 are provided is acted as an example. The radar 41, the camera 42, the processor 43, the memory 44, the input apparatus 45, and the output apparatus 46 in the vehicle may be connected via a bus or in other manners, where the connection via a bus is shown as an example in FIG. 7.

The memory 44 is acted as a computer-readable storage medium for storing software programs, computer-executable programs, and modules, such as program instructions/modules corresponding to the method for determining a heading angle of an angled parking space according to the embodiments of the present application. The processor 43 executes software programs, instructions, and modules stored in the memory 44 to perform various functional applications and data processing of the vehicle, that is, to perform the preceding method for determining a heading angle of an angled parking space.

The memory 44 may mainly include a program storage region and a data storage region, where the program storage region may store an operating system and an application program required by at least one function, and the data storage region may store the data created according to the use of the terminal. Additionally, the memory 44 may include a high-speed random-access memory and may also include a non-volatile memory, such as at least one magnetic disk memory, a flash memory, or another non-volatile solid-state memory. In some examples, the memory 44 may also include memories which are remotely disposed relative to the processor 43, and these remote memories may be connected to the vehicle via a network. Examples of the preceding network include, but are not limited to, the Internet, an intranet, a local area network, a mobile communication network, and a combination thereof.

The input apparatus 45 may be configured to receive inputted digital or character information and generate key signal input related to user settings and function control of the vehicle. The output apparatus 46 may include a display device such as a display screen.

The various embodiments of the systems and techniques described herein may be implemented in digital electronic circuitry, integrated circuitry, a field-programmable gate array (FPGA), an application-specific integrated circuit (ASIC), an application-specific standard product (ASSP), a system on a chip (SoC), a complex programmable logic device (CPLD), computer hardware, firmware, software, and/or a combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Computer programs for implementation of the methods of the present application may be written in one programming language or any combination of multiple programming languages. The computer programs may be provided for a processor of a general-purpose computer, a special-purpose computer, or another programmable data processing apparatus to enable functions/operations specified in a flowchart and/or a block diagram to be implemented when the computer programs are executed by the processor. The computer programs may be executed entirely on a machine, partly on a machine, as a stand-alone software package partly on a machine and partly on a remote machine, or entirely on a remote machine or a server.

In the context of the present application, the computer-readable storage medium may be a tangible medium that may include or store a computer program used by or used in conjunction with an instruction execution system, apparatus, or device. The computer-readable storage medium may include, but is not limited to, an electronic, magnetic, optical, electromagnetic, infrared, or semiconductor system, apparatus, or device or any suitable combination thereof. Optionally, the computer-readable storage medium may be a machine-readable signal medium. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any suitable combination thereof.

In order that interaction with a user is provided, the systems and techniques described herein may be implemented on a vehicle. The vehicle has a display apparatus (for example, a cathode-ray tube (CRT) or liquid-crystal display (LCD) monitor) for displaying information to the user and a keyboard and a pointing apparatus (for example, a mouse or a trackball) through which the user can provide input for the vehicle. Other types of apparatuses may also be used for providing interaction with a user. For example, feedback provided for the user may be sensory feedback in any form (for example, visual feedback, auditory feedback, or tactile feedback); and input from the user may be received in any form (including acoustic input, voice input, or tactile input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with embodiments of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in conventional physical host and virtual private server (VPS) services.

What is claimed is:

1. A method for determining a heading angle of an angled parking space, comprising:

acquiring environmental information of a vehicle, wherein the environmental information is information about a surrounding environment of the vehicle and related to the vehicle driving out of the angled parking space;

obtaining a first reference point and a second reference point according to the environmental information, wherein a line connecting the first reference point and the second reference point is parallel to a road; and determining, according to coordinates of the first reference point and coordinates of the second reference point, the heading angle of the vehicle parking out of the angled parking space;

wherein in response to the environmental information comprising obstacle information, obtaining the first reference point and the second reference point according to the environmental information comprises:

scanning obstacles on two sides of the vehicle by radar to obtain a set of point coordinates of the obstacles; and determining the first reference point and the second reference point based on two points that are in the set of point coordinates and are closest to the road, comprising:

acquiring the two points that are in the set of point coordinates and are closest to the road;

processing a point that is not at an edge of the road among the two points to obtain the first reference point; and a point at the edge of the road among the two points acting as the second reference point;

wherein processing the point that is not at the edge of the road among the two points to obtain the first reference point comprises:

translating an x-coordinate of the point that is not at the edge of the road among the two points by a preset distance to obtain a translated point, wherein a translation direction is away from the vehicle; and the translated point acting as the first reference point.

2. The method of claim 1, wherein in response to the environmental information comprising image information, obtaining the first reference point and the second reference point according to the environmental information comprises:

acquiring the image information of the surrounding environment of the vehicle through a camera;

when identifying, according to the image information, that parking space lines exist at least one of in a parking region or on two sides of the vehicle, identifying two points of intersection of the parking space lines closest to a front end of the vehicle in the image information and coordinates of the two points of intersection of the parking space lines according to a vision algorithm; and the two points of intersection of the parking space lines acting as the first reference point and the second reference point, respectively.

3. The method of claim 1, wherein determining, according to the coordinates of the first reference point and the coordinates of the second reference point, the heading angle of the vehicle parking out of the angled parking space comprises:

calculating an included angle between a y-axis and a line segment between the first reference point and the second reference point according to inverse trigonometric functions, wherein a direction of the y-axis is the same as a movement direction of the vehicle; and the included angle acting as the heading angle of the vehicle parking out of the angled parking space.

4. The method of claim 1, further comprising: before acquiring the environmental information of the vehicle, determining whether automatic parking information of the vehicle exists, in response to determining that the automatic parking information of the vehicle does not exist, performing an operation of acquiring the environmental information of the vehicle; and in response to determining that the automatic parking information of the vehicle exists, determining, according to the automatic parking information of the vehicle, a parking space angle during the vehicle parking in a parking space; and determining, according to the parking space angle, the heading angle of the vehicle parking out.

5. A vehicle, comprising:

at least radar;

at least one camera;

at least one processor; and a memory communicatively connected to the at least one processor, wherein the at least radar and the at least one camera are communicatively connected to the at least one processor and the memory;

wherein the memory is configured to store at least one computer program executable by the at least one processor, and wherein the at least one computer program is configured to, when executed by the at least one processor, cause the at least one processor to perform:

acquiring environmental information of a vehicle, wherein the environmental information is information about a surrounding environment of the vehicle and related to the vehicle driving out of the angled parking space;

obtaining a first reference point and a second reference point according to the environmental information, wherein a line connecting the first reference point and the second reference point is parallel to a road; and determining, according to coordinates of the first reference point and coordinates of the second reference point, the heading angle of the vehicle parking out of the angled parking space;

wherein in response to the environmental information comprising obstacle information, the at least one computer program is configured to, when executed by the at least one processor, cause the at least one processor to perform: obtaining the first reference point and the second reference point according to the environmental information in the following manner:

scanning obstacles on two sides of the vehicle by radar to obtain a set of point coordinates of the obstacles; and determining the first reference point and the second reference point based on two points that are in the set of point coordinates and are closest to the road in the following manner:

acquiring the two points that are in the set of point coordinates and are closest to the road;

processing a point that is not at an edge of the road among the two points to obtain the first reference point; and a point at the edge of the road among the two points acting as the second reference point:

wherein processing the point that is not at the edge of the road among the two points to obtain the first reference point comprises:

translating an x-coordinate of the point that is not at the edge of the road among the two points by a preset distance to obtain a translated point, wherein a translation direction is away from the vehicle; and the translated point acting as the first reference point.

6. A non-transitory computer-readable storage medium storing computer instructions which, when executed by a processor, cause the processor to perform:

acquiring environmental information of a vehicle, wherein the environmental information is information about a surrounding environment of the vehicle and related to the vehicle driving out of the angled parking space;

obtaining a first reference point and a second reference point according to the environmental information, wherein a line connecting the first reference point and the second reference point is parallel to a road; and determining, according to coordinates of the first reference point and coordinates of the second reference point, the heading angle of the vehicle parking out of the angled parking space;

wherein in response to the environmental information comprising obstacle information, the computer instructions which, when executed by the processor, cause the processor to perform:

obtaining the first reference point and the second reference point according to the environmental information in the following manner:

scanning obstacles on two sides of the vehicle by radar to obtain a set of point coordinates of the obstacles; and determining the first reference point and the second reference point based on two points that are in the set of point coordinates and are closest to the road in the following manner:

acquiring the two points that are in the set of point coordinates and are closest to the road;

processing a point that is not at an edge of the road among the two points to obtain the first reference point; and a point at the edge of the road among the two points acting as the second reference point;

wherein processing the point that is not at the edge of the road among the two points to obtain the first reference point comprises:

translating an x-coordinate of the point that is not at the edge of the road among the two points by a preset distance to obtain a translated point, wherein a translation direction is away from the vehicle; and the translated point acting as the first reference point.

7. The vehicle of claim 5, wherein in response to the environmental information comprising image information, the at least one computer program is configured to, when executed by the at least one processor, cause the at least one processor to perform: obtaining the first reference point and the second reference point according to the environmental information:

acquiring the image information of the surrounding environment of the vehicle through a camera;

when identifying, according to the image information, that parking space lines exist at least one of in a parking region or on two sides of the vehicle, identifying two points of intersection of the parking space lines closest to a front end of the vehicle in the image information and coordinates of the two points of intersection of the parking space lines according to a vision algorithm; and the two points of intersection of the parking space lines acting as the first reference point and the second reference point, respectively.

8. The vehicle of claim 5, wherein the at least one computer program is configured to, when executed by the at least one processor, cause the at least one processor to perform: determining, according to the coordinates of the first reference point and the coordinates of the second reference point, the heading angle of the vehicle parking out of the angled parking space in the following manner:

calculating an included angle between a y-axis and a line segment between the first reference point and the second reference point according to inverse trigonometric functions, wherein a direction of the y-axis is the same as a movement direction of the vehicle; and the included angle acting as the heading angle of the vehicle parking out of the angled parking space.

9. The vehicle of claim 5, the at least one computer program is configured to, when executed by the at least one processor, cause the at least one processor to further perform: before acquiring the environmental information of the vehicle, determining whether automatic parking information of the vehicle exists, in response to determining that the automatic parking information of the vehicle does not exist, performing an operation of acquiring the environmental information of the vehicle; and in response to determining that the automatic parking information of the vehicle exists, determining, according to the automatic parking information of the vehicle, a parking space angle during the vehicle parking in a parking space; and determining, according to the parking space angle, the heading angle of the vehicle parking out.

* * * * *